United States Patent [19]
McDonald

[11] Patent Number: 5,500,112
[45] Date of Patent: Mar. 19, 1996

[54] APPARATUS FOR BIOLOGICAL TREATMENT OF EFFLUENT

[76] Inventor: Alistair J. McDonald, Inglewood, Invergordon, Scotland, IV18 OPW

[21] Appl. No.: 488,838

[22] Filed: Jun. 9, 1995

Related U.S. Application Data

[63] Continuation of Ser. No. 938,267, filed as PCT/GB91/00642, Apr. 23, 1991, abandoned.

[30] Foreign Application Priority Data

Apr. 24, 1990 [GB] United Kingdom .............. 9009205

[51] Int. Cl.$^6$ .................. C02F 3/06; C02F 9/00; C02F 3/10; C02F 3/20
[52] U.S. Cl. ................. 210/151; 210/201; 210/220
[58] Field of Search .................. 210/615–617, 210/150, 151, 205, 220, 199, 201, 255; 261/121.1

[56] References Cited

U.S. PATENT DOCUMENTS

| | | | |
|---|---|---|---|
| 4,188,289 | 2/1980 | Besik | 210/617 |
| 4,666,593 | 5/1987 | Bosne | 210/150 |
| 4,680,111 | 7/1987 | Veda | 210/615 |
| 4,925,552 | 5/1990 | Bateson et al. | 210/617 |
| 5,116,506 | 5/1992 | Williamson et al. | 210/615 |

*Primary Examiner*—Thomas Wyse
*Attorney, Agent, or Firm*—Watov & Kipnes

[57] ABSTRACT

Effluent to be treated is introduced into the top of a first bioreactor 10 through an inlet pipe 16 and, after passing through second and third bioreactors 11 and 12, passes through a settling device 17, the treated effluent then flowing over a depth control weir 18 into an outlet pipe 19. The three bioreactors 10, 11 and 12 and the settling device 17 are housed in a tank having three sets of vertically-staggered transverse partitions 21, 22, 23 and a transverse settling tank partition 24. Each set of staggered partitions 21, 22 and 23 are arranged so that the bioreactors are interconnected in series, the effluent preferably being constrained to pass downwardly through each matrix 13, 14, 15 in turn against an upward discharge of very fine air bubbles from aeration panels 28 which extend under substantially the whole of each matrix. Aerobic bacteria feeds on nutrients in the effluent and grows on the roughened walls of the cross-flow matrix and the air bubbles promote sloughing of the bacteria. The apparatus therefore comprises three or more separate total mixed bioreactors working in sequence, each serving to reduce the biological oxygen demand of all the effluent whereby the biological oxygen demand is progressively reduced.

15 Claims, 2 Drawing Sheets

APPARATUS FOR BIOLOGICAL TREATMENT OF EFFLUENT

This is a continuation application of U.S. Ser. No. 07/938,267 filed as PCT/GB91/00642, Apr. 23, 1991, abandoned.

FIELD OF THE INVENTION

The present invention is concerned with a process for biological treatment of effluent and also with apparatus for performing the process.

BACKGROUND OF THE INVENTION

Many domestic, industrial, agricultural and aqua-cultural processes result in effluents having a very high biological oxygen demand (BOD) which must be substantially reduced before the treated effluent can be finally discharged. Such effluents are typically associated with the preparation or consumption of food stuffs, for instance fluids from food preparation and sewage.

For quite some time it has been known that such effluents are nutrient rich and can be biologically de-graded by treatment with appropriate bacterial cultures. Such bacteria feed on the nutrients and destroy many of the waste substances.

It is well-known that the effectiveness of aerobic bacteria is dependent on the amount of dissolved oxygen in the effluent and that such bacteria prefer to grow on a fixed surface. In order to promote the activity of aerobic bacteria it is well-known to oxygenate the effluent and to provide a submerged matrix having a large surface area for colonisation by the bacteria. For instance, Smith and Loveless Inc of Lenexa, Kans., United States of America have marketed a domestic sewage treatment plant in which a shrouded matrix of corrugated plastic sheets defining cross-flow passages is suspended in a portion of a cesspit adjacent a discharge pipe for the treated effluent. An electric motor drives a submerged impeller to draw the sewage from the cesspit into the shroud above the matrix whereby the sewage then flows downwards through the matrix back into the cesspit. The motor also drives a fan to supply air to the agitated surface of the sewage above the matrix thereby oxygenating the liquid. Bacteria grows on the surfaces of the matrix until it eventually sloughs off and falls into the bottom of the cesspit where it joins other settled solids and then undergoes anaerobic bacterial degradation. This prior proposal will certainly reduce the BOD of the fluid leaving the system through the discharge pipe but its overall efficiency is impaired by the low rate of oxygenation and the mixing of the liquid leaving the bottom of the matrix with the contents of the cesspit. Another system being used is that developed by the Polybac Corporation of Allentown, Pa., United States of America and sold as the CTX Bioreactor. This bioreactor comprises a tank having a single matrix constructed of modules stacked side-by-side over a series of air pipes which are spaced about 50 cm apart and have large holes in their upper surfaces spaced about 5 cm apart. The air leaving these holes passes upwards through the cross-flow passages of the matrix causing the liquid to be uplifted over each pipe and then to flow downwards again through the matrix in positions between the pipes. In this manner the air supply, in addition to oxygenating the liquid, serves to pump the liquid upwards and downwards through the matrix with a vertical and a horizontal mixing action. In those regions of the matrices where the liquid is being pumped upwards by the air bubbles, the oxygenation promotes aerobic bacterial growth on the walls of the matrices and, when such bacterial growth is sufficiently thick, promotes its sloughing off the walls. However, the rate of oxygen absorption is low due to the large air bubbles, and the liquid passing downwards through the matrix essentially holds less oxygen. As a result the rate of bacterial growth in the downflow portions of the matrix is lower than in the upflow portions and this bacterial growth is not physically disturbed by the passage of air bubbles. As a result the slower bacterial growth in the downflow portions of the matrix tends to accumulate thereby progressively blinding the cross-flow passages in this portion of the matrix. This apparatus can promote significant BOD reduction by the time the liquid leaves the tank but the horizontal mixing of the liquid in between the liquid inlet and liquid outlet of the tank means that a proportion of the incoming fluid will reach the outlet without being adequately treated.

U.S. Pat. No 4,680,111 teaches a sewage treatment equipment with activated sludge process beds comprising a plurality of treatment tanks which are separated by bulkheads and dashboards such that the bottom of each treatment tank is connected by a passage behind its dashboard to a horizontal passage through its bulkhead into the top of an adjoining treatment tank. An aeration pipe extends across part of the floor of each treatment tank and is formed with slits through which air is blown out into the sewage water in the form of air bubbles. A series of activated sludge processing beds are located by support rods extending between the bulkhead and dashboard of each treatment tank and generally comprise a cylindrical core of hard synthetic resin surrounded by a porous member formed of corrosion resistant yarns intertwisted with spongy mesh-like or fibrous synthetic resin. These sludge processing beds are provided for the growth of both aerobic and anaerobic bacteria, and also of giant micro-organisms. The outer periphery of each sludge processing bed is a site for aerobic bacterial growth whilst anaerobic bacterial growth occurs inside due to the construction of the sludge processing beds restricting access to the air bubble. Indeed the construction of the sludge processing beds is varied from treatment tank to treatment tank so that the proportion of anaerobic bacteria increased progressively from 20% to 60% of the total bacterial growth. Various giant micro-organisms are introduced into the equipment to eat the accumulating bacterial growth on the sludge processing beds. This form of sewage treatment equipment is incapable of processing effluent by predominant aerobic bacterial action and is, to the contrary, intended to operate by a combined aerobic/anaerobic process of which the anaerobic component increases progressively through the treatment. The construction of the sludge processing beds are such that the bacterial growths will attach themselves so firmly to the twisted fibres that blinding can only be prevented by the introduction of organisms which will graze the accumulating bacterial growths. The slits in the aeration pipes will inherently form large air bubbles, and the size and positioning of each-aeration pipe in its chamber is such that the flow of air inevitably favours the central portion of each group of sludge processing beds.

It is an object of the present invention to provide a process for the treatment of effluent predominantly by aerobic bacteria which is of greater effectiveness, and also to provide apparatus for performing that process.

SUMMARY OF THE INVENTION

According to one aspect of the invention an efficient treatment process, for the treatment of effluent by aerobic bacteria in a series of bioreactors, comprises passing the effluent through a submerged fixed film matrix in each bioreactor, constraining a flow of very fine air bubbles to pass upwards through all of the effluent in the bioreactors to mix the efficient and to promote growth of aerobic bacteria on the fixed film matrices and displaying partially treated effluent from each bioreactor to the next bioreator in the series whereby each bioreactor in the series will serve progressively to reduce the biological oxygen demand of the effluent. The process preferably includes using the flow of very fine air bubbles to cause excess of aerobic bacteria to slough off the surfaces of the fixed film matrices. The process may also include keeping the sloughed bacterial growths in suspension by the flow of very fine air bubbles.

The fineness of the air bubbles preferably gives a Standard Oxygen Transfer Efficiency of at least 30%. Preferably the fineness of the air bubbles gives a Standard Oxygen Transfer Efficiency of between 30% and 60%.

The process preferably includes using the flow of effluent to entrain sloughed bacterial growths from each bioreactor into the next bioreactor of the series.

The process preferably includes providing a sufficient number and size of bioreactors, for the rate of effluent flow and the physical properties of the effluent, that the biological oxygen demand of the liquid leaving the process is less than 200. Preferably the number and size of bioreactors is sufficient to reduce the biological oxygen demand of the liquid leaving the process to less than 20.

The process preferably includes matching the number and size of the bioreactors to the rate of effluent flow and the physical properties of the effluent, whereby the aerobic bacteria will feed on itself in at least the last bioreactor in the series.

The process preferably includes passing the liquid leaving the last bioreactor in the series into a settling device to separate any remaining solids.

The process preferably includes sterilising the resultant liquid by subjecting it to ultra-violet radiation.

According to another aspect of the invention effluent treatment apparatus, for the treatment of effluent by aerobic bacteria, has each matrix in the form of a submerged fixed film matrix defining surfaces for bacterial colonisation and aeration means having very fine openings for discharging very fine air bubbles through substantially the entire fixed film matrix to promote the growth of aerobic bacteria on the fixed film matrix whilst inhibiting the growth of anaerobic bacteria in this manner each bioreactor in the series serves progressively to reduce the biological oxygen demand of the effluent. The bioreactors maybe interconnected so that the effluent is constrained to pass downwardly against the upward flow of the air bubbles in at least one of the bioreactors. In this case, the bioreactors may be interconnected so that the flow of the partially-treated effluent will be taken from the bottom of the said one bioreactor to the top of the next bioreactor in the series.

Each fixed film matrix is preferably formed from a series of corrugated sheets to give a high surface area to volume ratio. This ratio is preferably in excess of 200. The corrugations are preferably arranged in cross-flow manner. The corrugated sheets are preferably provided with a rough surfaces to facilitate bacterial colonisation.

Each aeration means is preferably an aeration panel extending under substantially the entire area of the associated fixed film matrix. Each aeration panel preferably includes a very finely perforated flexible membrane arranged to be distended by internal air pressure to open its perforations to release said air bubbles.

The last bioreactor in the series is preferably connected to a settling device to allow any remaining solids to precipitate. The settling device preferably includes a tube settler. The tube settler preferably includes a matrix of upwardly inclined tubes having smooth walls. These tubes are preferably formed of hexagonal section and preferably are inclined at about 45°.

An ultra-violet steriliser is preferably connected to the outlet from either the last bioreactor of the series, or any settling device, in order to kill any organisms in the treated effluent.

Each bioreactor is preferably of modular construction so that the number of bioreactors in the series can be chosen such that the biological oxygen demand of any effluent can be reduced to a predetermined level. Each modular bioreactor preferably includes a tank for supporting a fixed film matrix and a aeration means, defines walls for constraining the effluent to pass through the fixed film matrix, and also defines an outlet for the treated effluent at its bottom. Preferably the tanks are sealingly secured side-by-side to define a duct between them leading from the outlet of each tank to the inlet of the next tank in the series. This duct preferably leads from the bottom of one tank to a position above the fixed film matrix of the next tank in the series. Preferably the modules are secured together by complementary flanges with intervening seals.

BRIEF DESCRIPTION OF THE DRAWINGS

The invention will now be described, by way of example only, with reference to the accompanying drawings, in which.

DETAILED DESCRIPTION OF THE INVENTION

Figure 1:
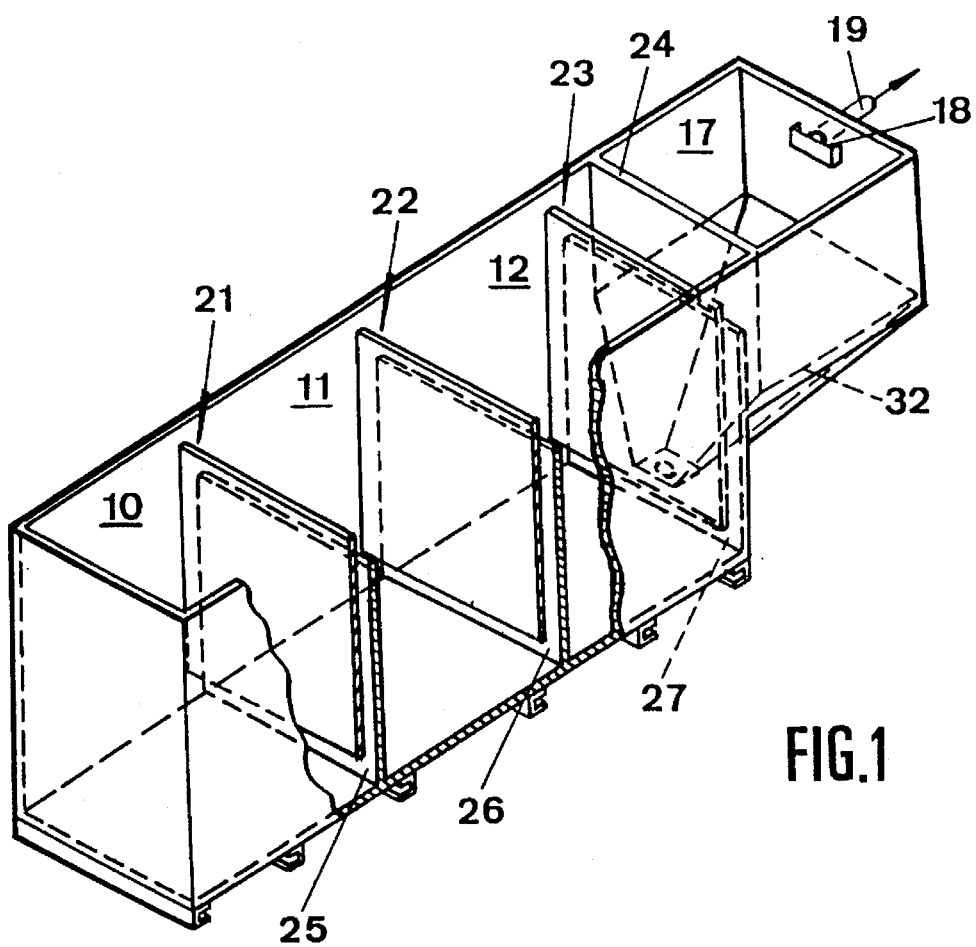
FIG. 1 is an isometric view of a tank for containing a series of bioreactors and a settling device, part of the side being cut away to show its interior.
Figure 2:
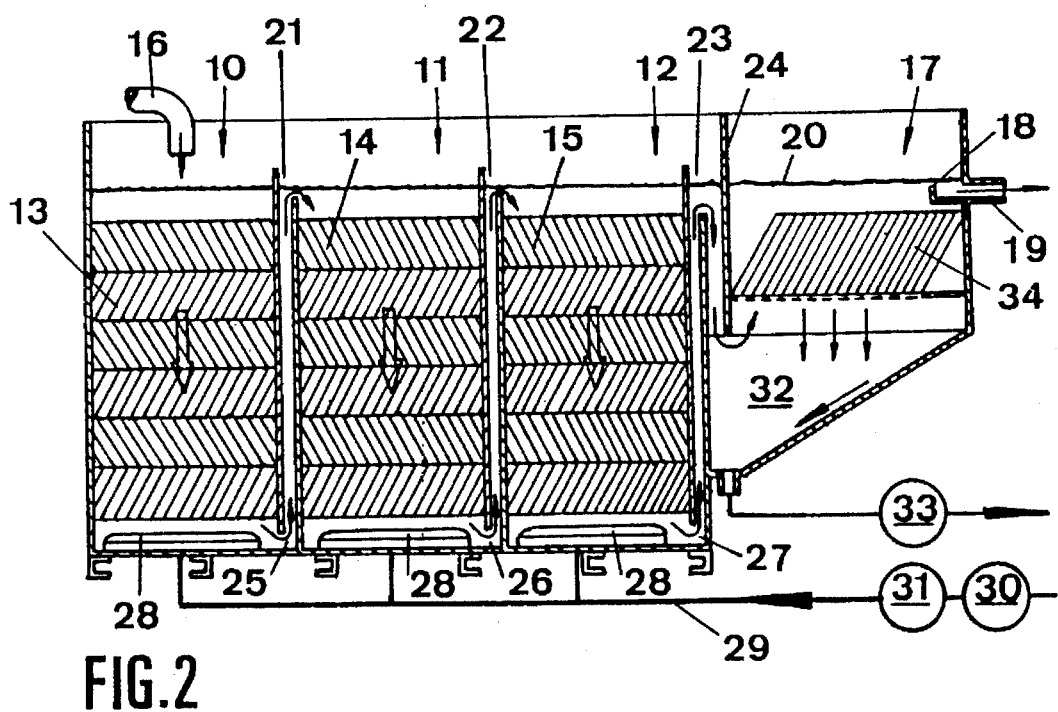
FIG. 2 is a longitudinal vertical section through the tank of FIG. 1 together with its bioreactors and settling device.

With particular reference to FIGS. 1 and 2, apparatus for the treatment of effluent by aerobic bacteria comprises a series of three fixed film bioreactors 10, 11, 12 having respective matrices 13, 14 and 15. Each matrix 13, 14, 15 comprises a series of rigid corrugated plastic sheets arranged alternately in crisscross fashion to provide a labyrinth of interconnected cross flow channels. These plastic sheets are formed with a roughened surface and with surface indentations to facilitate bacterial colonisation. Matrices of this type are commonly used in trickling towers and are also used in the previously mentioned systems developed by Smith and Loveless Inc and by the Polybac Corporation. Such matrices give a high surface area to volume ratio, that used by Polybac Corporation having a ratio of between 100 and 140 square metres per cubic meter, their ratio being limited by the flow area of the individual cross-flow passages needed to compensate for the aforementioned blinding problem in the downflow portions of their matrix.

Effluent for treatment is introduced to the top of the first bioreactor 10 through an inlet pipe 16 and, after passing through the three bioreactors 10, 11 and 12 (in a manner which will shortly be described), passes through a settling device 17, the treated effluent then flowing over a depth control weir 18 into an outlet pipe 19. By the action of the weir 18 the fluid depth in the whole apparatus is retained at approximately the level 20 so that all three matrices 13, 14 and 15 are kept fully submerged.

The three bioreactors 10, 11, 12 and the settling device 17 are housed in a tank having three sets of vertically-staggered transverse partitions 21, 22, 23 and a transverse settling tank partition 24. Each set of staggered partitions 21, 22 and 23 are arranged as shown such that the bioreactors 10, 11 and 12 are interconnected in series whereby the effluent is constrained to pass downwardly through each bioreactor in turn, and the partially-treated effluent flows from the bottom of each bioreactor through respective outlets 25, 26 and then vertically upwards into the top of the next bioreactor. The outlet 27 from the last bioreactor 12 is further constrained by the settling tank partition 24 to flow into the bottom of the settling tank 17.

Figure 3:
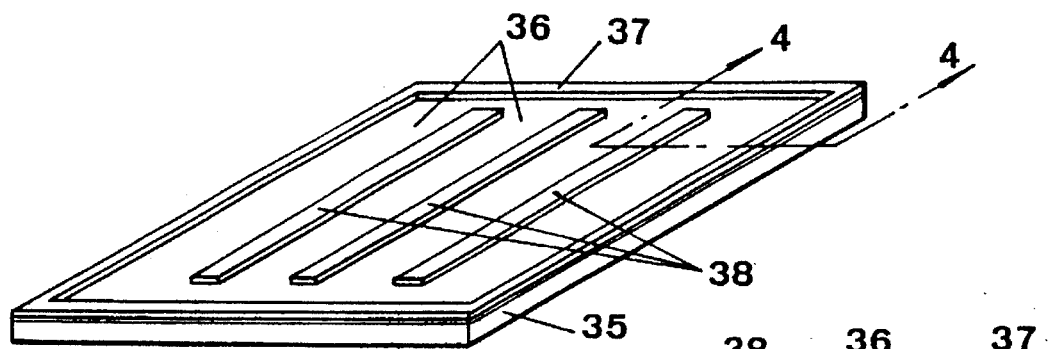
FIG. 3 is an enlarged isometric view of one of the aeration panels shown in FIG. 2.
Figure 4:
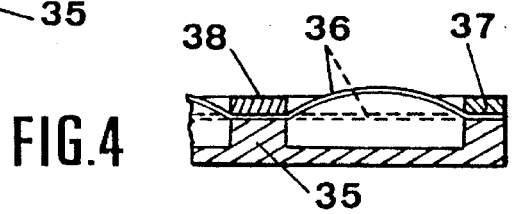
FIG. 4 is an enlarged cross-section on the line 4—4 in FIG. 3.

An aeration means in the form of an aeration panel 28 is positioned beneath each of the matrices 13, 14, 15 and is connected to an air line 29 controlled by an on-off valve 30 and a flow control valve 31. Details of the aeration panel 28 will be given later with reference to FIGS. 3 and 4. By turning on the valve 30 and regulating the air flow by manipulating the flow control valve 31, the three aeration panels 28 discharge very fine air bubbles under substantially the whole of each of the matrices 13, 14 and 15. With the apparatus shown the horizontal dimensions of each matrix is 1.2 meters square and the aeration panels 28 are 1 meter square, the top surface of each aeration panel being about 5 centimeters below the bottom of the corresponding matrix. As a result the very fine air bubbles are discharged through substantially the whole of each matrix and flow upwards against the downflow of effluent, or partially-treated effluent, as the case may be. In this manner all of the effluent, or partially-treated effluent, is equally exposed to the fine air bubbles in each bioreactor thereby ensuring that there is no oxygen limitation to the bacterial action in any part of the matrices and that there is no danger of blinding.

As a result the bacteria grows substantially uniformly over the whole surface area of each matrix and the action of the air bubbles helps to promote the sloughing of the bacteria which then falls towards the bottom of the tank and is entrained by the liquid flowing into the next bioreactor. In this manner the apparatus comprises three separate total mixed reactors working in sequence, each bioreactor serving to reduce the biological oxygen demand of all the effluent flowing through it whereby the biological oxygen demand is progressively reduced through the apparatus.

Due to the even oxygenation of each matrix preventing blinding, I have found that I have been able to use matrices with much finer cross-flow passages than have been successfully used before and this further increases the efficiency of the apparatus by increasing the effective surface area for bacterial colonisation. Indeed I have been able to use a surface to volume ratio of 230 square meters per cubic meter.

The settling tank 17 is only necessary when it is desired to separate any remaining solids from the treated effluent. On passing from the last bioreactor 12, the treated liquid and entrained solids flows into the bottom 32 of the settling tank which is of hopper shape terminating in an outlet controlled by an on-off valve 33. The larger solids settle in this portion of the settling tank, leaving the liquid and finer solids to flow gently upwards through a tube settler matrix 34 comprising hexagonal tubes which are upwardly inclined at about 45° and have smooth walls. The entrained bacteria particles try to colonise the smooth walls of the hexagonal tubes but, after aggregating to a certain size, slip off and fall into the bottom 32 of the settling tank thereby leaving clear liquid with low BOD to flow over the weir 18 into the outlet pipe 19. From time-to-time the valve 33 will be opened for a short time to draw off accumulated sediment.

The amount by which the BOD is reduced, before the treated effluent is discharged from the last bioreactor 12 of the series, depends on many factors including the initial BOD, whether the effluent flows downwardly against the upward flow of air bubbles or upwardly in the same direction as the bubbles, the rate of flow compared with the size of each bioreactor, the temperature and other factors. For a given performance it is necessary to alter either the size or number of bioreactors. By doing so it is possible to reduce the BOD to a level suitable for discharge into a water-course (for instance a BOD of 20), or to a level suitable for discharge into a soak-away (for instance a BOD of 200). The levels of BOD accepted as suitable for discharge into water-courses or soakaways at present varies from area to area. However the apparatus, by progressively reducing the BOD in stages, is capable of reducing the BOD of effluents to an extremely low level and the last bioreactor/s in the series can promote the bacterial sludge to consume itself and can promote nitrification. In the fish-farming industry it is necessary to dispose of fish blood and other fluids having a high BOD, and the apparatus described is capable of doing this. If there is any possibility of any living organisms remaining in the liquid leaving the outlet pipe 19, it can be passed through an ultra-violet sterilisation unit.

When used for disposal of blood or other effluents emanating from intermittent processes, it is important to use equipment which can readily be shut down. For this reason I prefer to use aeration panels 28 of the type which is now described with reference to FIGS. 3 and 4. Each panel 28 comprises a poly(vinyl chloride) base plate 35 on which a flexible membrane 36 is fitted by means of a frame 37 and retaining bars 38 made of fibre reinforced plastic. The membrane 36 is formed from synthetic rubber about 0.7 millimeters thick which has been very finely perforated over its entire effective surface. When the air pressure below the membrane is less than the hydrostatic head of the liquid above it, the membrane 36 occupies the dotted position shown in FIG. 4 and the perforations remain closed thereby preventing the ingress of any liquid. However, in operation, the air pressure applied beneath the membrane 36 causes it to distend as shown thereby opening the perforations to discharge very fine bubbles. Usually the concept of using very fine apertures in a bioreactor would be considered unworkable as they would be colonised by the bacteria and consequently become blocked. However, with this type of flexible membrane such colonisation is not a problem as the fine perforations merely deflect slightly as they start to become blocked and thereby detach any significant bacterial accumulation.

Figure 5:
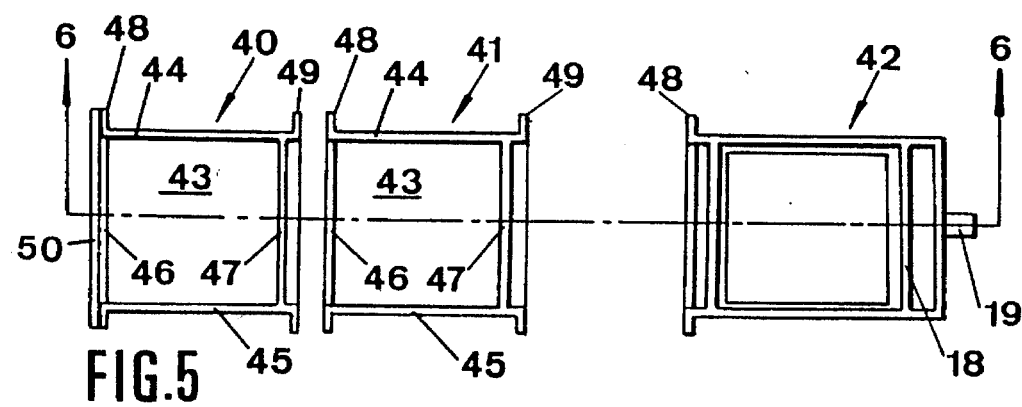
FIG. 5 is a plan view showing a modular construction for the tank shown in FIGS. 1 and 2.
Figure 6:
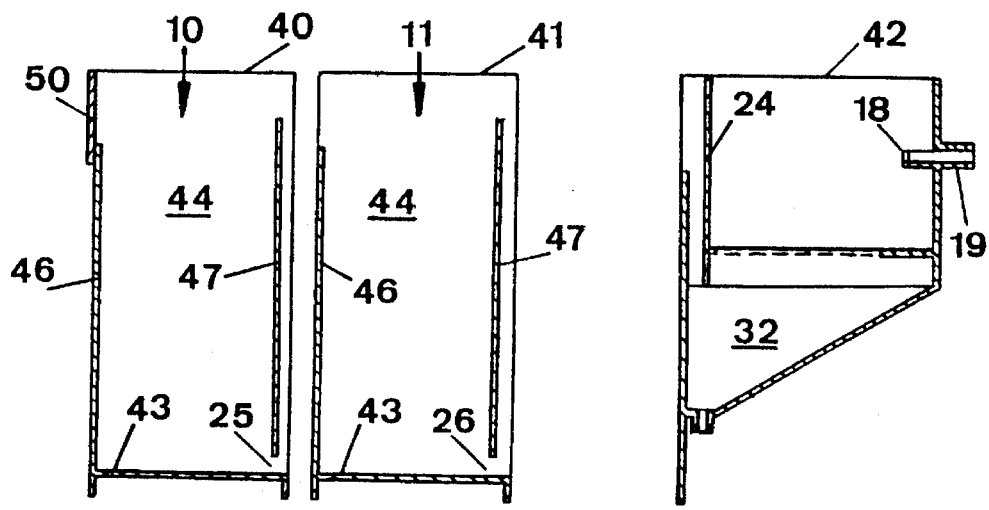
FIG. 6 is a vertical section taken along the line 6—6 in FIG. 5.

As previously stated, the apparatus can be tailored to meet various operational parameters either by varying the size or number of the bioreactors. However I prefer to retain a standard size of bioreactor and alter performance by adjusting the number of bioreactors forming the series. This concept is enhanced by the adoption of a modular construction such as that now described with reference to FIGS. 5 and 6. Two identical modular tank units 40, 41 are shown, but any number may be mounted side-by-side, the last tank unit in the series being mounted to a settling tank unit 42 if such separation of any remaining solids is required.

Each modular tank unit 40, 41 comprises a base 43, two side walls 44, 45 and two end walls 46, 47 with adjacent external flanges 48, 49. In each modular tank unit the side walls 44, 45 and one end wall 46 are formed integral with (or otherwise secured to) the base 43 and with each other, but the other end wall 47, whilst being formed integral with (or otherwise secured to) the two side walls 44, 45, is left spaced from the base 43 to define one of the previously mentioned outlets 25, 26. The side walls 44, 45 and the end walls 46, 47 of each tank unit 40, 41 are arranged to support the matrix and the base 43 to support the aerator panel 28.

The modules 40, 41 et seq and the settling tank unit 42 are bolted together through their respective abutting flanges 48, 49 with an interposed resilient seal to form a tank having the same general features: as already described with reference to FIGS. 1 and 2. In this connection it should be noted that the end walls 47 are spaced inwardly of the adjacent flanges 49 so that the adjoining end walls 47 and 46 of adjacent modules define the staggered partitions 21, 22, 23 shown in FIGS. 1 and 2 thus defining a duct leading from the outlet 25 or 26 at the bottom of each tank module to a position above the matrix position of the next tank module in the series. It should also be noted that a plate 50 is bolted, or otherwise secured, to the first tank module 40 thereby extending the upper edge of its end wall 46 into alignment with the top edge of the module. Instead of utilising a plain plate 50, this could be replaced by a unit including the effluent inlet pipe 16 shown in FIG. 2. In the event that no settling tank is required, another plain plate would be bolted, or otherwise secured, to the flange of the last module and could conveniently incorporate the weir 18 and outlet pipe 19.

Instead of being arranged underneath the bioreactor tank as shown in FIG. 2, the air supply line 29 may conveniently be fitted with spurs extending between the partitions 21, 22 and 23 thereby preserving the integrity of the tank bottom.

I claim:

1. Effluent treatment apparatus, for the treatment of effluent by aerobic bacteria, including a series of bioreactors interconnected such that the effluent is constrained to pass through each bioreactor in turn, and each bioreactor comprises a tank for effluent to be treated, a submerged fixed film matrix defining surfaces for bacterial colonization positioned within said tank below the effluent surface, and aeration means arranged beneath said matrix and entering under substantially the entire horizontal area of said matrix, said aeration means defining very fine openings to discharge very fine air bubbles, and said very fine openings being positioned to direct said very fine air bubbles between substantially all of said surfaces defined by said fixed film matrix.

2. Apparatus, according to claim 1, in which each fixed film matrix is formed from a series of corrugated sheets, and has a surface area to volume ratio in excess of 200.

3. Apparatus, according to claim 1, in which each fixed film matrix is formed from a series of corrugated sheets having rough surfaces to facilitate bacterial colonization.

4. Apparatus, according to claim 1, in which each aeration means is an aeration panel extending under substantially the entire area of the associated fixed film matrix.

5. Apparatus, according to claim 4, in which each aeration means includes a very finely perforated flexible membrane arranged to be distended by internal air pressure to open its perforations to release said very fine air bubbles.

6. Apparatus, according to claim 1, in which a settling device is connected to receive treated effluent from the last bioreactor in the series.

7. Apparatus, according to claim 6, in which the settling device includes a tube settler.

8. Apparatus, according to claim 7, in which the tube settler includes a matrix of upwardly inclined tubes having smooth walls.

9. Apparatus, according to claim 1, in which an ultraviolet sterilizer is connected to receive the effluent after treatment by the aerobic bacteria.

10. Effluent treatment apparatus, for the treatment of effluent by aerobic bacteria, including a series of separate modular bioreactors interconnected such that the effluent is constrained to pass through each modular bioreactor in turn, and each modular bioreactor comprises a tank for effluent to be treated, a submerged fixed film matrix supported within said tank at a level below the operational surface of the effluent, said matrix defining surfaces for bacterial colonization by aerobic bacteria, and aeration means arranged beneath said matrix and extending under substantially the entire horizontal area of said matrix, said aeration means defining very fine openings to discharge very fine air bubbles, and said very fine openings being positioned to direct said very fine air bubbles between substantially all of said surfaces defined by said matrix to promote the growth of aerobic bacteria on said matrix surfaces.

11. Apparatus, according to claim 10, in which each tank defines walls for constraining the effluent to pass through the fixed film matrix, and an outlet for the treated effluent.

12. Apparatus, according to claim 11, in which the modular bioreactors are sealingly secured side-by-side to define a duct between them leading from said outlet to the inlet of the next modular bioreactor.

13. Apparatus, according to claim 12, in which said duct leads from the bottom of one modular bioreactor to a position above the fixed film matrix of the next modular bioreactor in the series.

14. A bioreactor, for reducing the biological oxygen demand of an effluent, comprising a chamber, a fixed matrix defining surfaces for colonisation by aerobic bacteria positioned within said chamber, an aeration means positioned underneath said matrix and extending under substantially the entire horizontal area of said matrix, said aeration means defining very fine openings to produce very fine air bubbles, and said openings are positioned to direct said very fine air bubbles between substantially all of said surfaces defined by said matrix.

15. A bioreactor, according to claim 14, in which said very fine openings are defined by perforations in a flexible membrane.

* * * * *